United States Patent
Turcovsky et al.

[11] Patent Number: 6,118,074
[45] Date of Patent: Sep. 12, 2000

[54] CURVED LID JUNCTION BOX

[75] Inventors: Gregory D. Turcovsky, Mentor; Peter M. Walters, Middlesfield; Herman Leukhardt, Jr., Eastlake, all of Ohio

[73] Assignee: The Lamson & Sessions Co., Cleveland, Ohio

[21] Appl. No.: 09/065,875

[22] Filed: Apr. 24, 1998

[51] Int. Cl.[7] ................................................ H02G 3/14
[52] U.S. Cl. .................................... 174/66; 220/241
[58] Field of Search .......................... 174/50, 66, 67, 174/17 CT, 53; 220/3.8, 241, 242

[56] References Cited

U.S. PATENT DOCUMENTS

| | | | |
|---|---|---|---|
| 291,771 | 1/1884 | Rasgorshek | 220/246 |
| 345,073 | 7/1886 | Phillips | 220/248 |
| 416,234 | 12/1889 | Perot . | |
| 2,881,940 | 4/1959 | Hamilton . | |
| 2,924,639 | 2/1960 | Zelt . | |
| 3,015,408 | 1/1962 | Campbell et al. . | |
| 3,364,952 | 1/1968 | Scaglione et al. . | |
| 4,674,646 | 6/1987 | Teron | 220/3.4 |
| 4,867,334 | 9/1989 | Robertson et al. | 174/66 X |
| 4,874,906 | 10/1989 | Shotey | 174/67 |
| 4,914,258 | 4/1990 | Jackson . | |
| 5,067,907 | 11/1991 | Shotey | 174/66 X |
| 5,379,912 | 1/1995 | Wolf | 220/241 X |
| 5,483,019 | 1/1996 | Tourigny . | |
| 5,550,708 | 8/1996 | Sienns . | |
| 5,553,730 | 9/1996 | Kohnen . | |
| 5,641,939 | 6/1997 | Tourigny . | |
| 5,731,544 | 3/1998 | Burck et al. | 174/66 |
| 5,914,460 | 6/1999 | Mowery et al. | 174/50 |

*Primary Examiner*—Dean A. Reichard
*Attorney, Agent, or Firm*—Jones, Day, Reavis & Pogue

[57] ABSTRACT

An electrical junction box for use within a curved structure is disclosed. The electrical junction box includes a housing member and a lid assembly. The lid assembly includes a base section and a cover portion. The base section has a planar surface and the cover portion has a radius of curvature substantially conforming to the radius of curvature of the curved structure. A method for installing a light pole using the invention is also disclosed.

22 Claims, 6 Drawing Sheets

CURVED LID JUNCTION BOX

BACKGROUND OF THE INVENTION

The present invention relates generally to an electrical junction box. In particular, the present invention relates to an electrical junction box which is adapted for use with cylindrical structures such as concrete piers used as mounting platforms for light poles or other similar structures. The electrical junction box according to the present invention provides protection and convenient access to electrical wires and other devices embedded within the cylindrical structure.

Electrical junction boxes are generally used in structures such as buildings to provide access to electrical power to electrical devices such as lighting fixtures or electrical receptacles. Typically, electrical power wires are routed into junction boxes. Inside the junction box, wires for supplying power to the electrical device are connected to the electrical power wires. Thus, the junction box provides a convenient location for the connection of an electrical device to electrical power lines.

In outdoor environments when electrical power is needed, for example, to supply power to a parking lot light, typically, the electrical power wires are routed directly to the electrical device without the use of a junction box. There are many disadvantages to this method of wiring. First, construction and installation are more difficult. For example, when installing a light pole, generally electrical power wires are routed underground through conduit to the location where the light pole is to be installed. A hole is dug at the location where the light pole is to be installed. A form such as a Sonotube™ form is installed in the hole and conduit is placed in the form. Concrete is poured in the form which provides a mold for the formation of a concrete pier on which a light pole will be mounted. After the concrete has cured and set, the power wires must then be pulled out of the conduit in the ground, pulled through the conduit in the concrete pier, and connected to the light fixture on the light pole. This method of installation is disadvantaged because, among other things, of the difficulties in constructing a concrete pier and at the same time providing access to the electrical power wires in the ground. Special care must be taken to insure that the electrical power wires are accessible after the concrete pier has cured. It is also difficult to pull the electrical power wires out of the ground, through the concrete pier, into the light pole, and up the light pole to the light fixture at the top of the light pole. Also, if additional electrical devices are required after the light pole has been wired, there are no convenient locations for connecting additional devices to the electrical power wires.

One attempt at simplifying the wiring of light poles is the metallic circular wedged shaped junction box disclosed in U.S. Pat. No. 5,553,730. The junction box disclosed therein is specifically designed to be cast within a cylindrical concrete pier. The junction box has curved front wall and front edge portions that have a radius of curvature substantially equal to that of the exterior of the concrete pier into which the junction box will be positioned. Thus, when the junction box is installed it substantially fits within the concrete pier and mounts substantially flush with the curved cylindrical concrete pier. This junction box simplifies the wiring of light poles because it provides a convenient location for connecting wires from the light pole to the electrical power wires.

During construction of the concrete pier using the junction box disclosed in U.S. Pat. No. 5,553,730, the junction box is positioned into cutouts in the form and the electrical power wires are pulled through the conduit in the form into the junction box prior to the pouring of concrete. After the concrete has been poured, set and cured and the form removed, the light pole can be installed. Wires from the light fixture on the light pole can be run down the light pole and into the junction box. This junction box, however, has many shortcomings. First, the junction box is difficult to install into a form. Some external means is needed to secure this junction box to the form. Second, the junction box is metallic and susceptible to corrosion. Third, the junction box must be installed in the form without the lid, thereby increasing construction costs. Construction costs are increased because the lid and the box are installed in two separate stages and because someone must keep track of the lid to make sure that it does not become misplaced. Fourth, because the junction box has curved walls, it can only be used in a cylindrical pier of a specified diameter and is not adaptable to cylindrical piers having different diameters. Also, the junction box is not U.L. rated and does not meet N.E.M.A. standards for weatherproof capabilities. In addition, the junction box is not easily modifiable to allow the mounting of electrical receptacles thereto. The junction box must also be grounded somehow. Finally, the junction box does not allow for the mounting of additional support hardware such as fuses, circuit breakers, terminal blocks, etc., inside the box.

Therefore, there remains a need in this art for a non-metallic junction box for use in outdoor environments. There remains a more particular need for a non-metallic junction box that can be installed in a cylindrical pier that is simpler and cheaper to install. It is desirable to have a non-metallic junction box for outdoor use that is U.L. listed and meets N.E.M.A. standards for weatherproofing. There, also, remains a need for a junction box that has the capability to mount electrical receptacles thereon and does not require grounding. There remains a need for a junction box that is less expensive to manufacture. There also is a need for a junction box that can be installed as one unit with the top in place. There remains a need for a junction box that can be used in cylindrical piers of different diameters. Finally, there remains a need for a non-metallic junction box that allows for the mounting of additional support hardware within the junction box.

SUMMARY OF THE INVENTION

The present invention overcomes the problems noted above and satisfies the needs in this field for a non-metallic curved lid junction box. The junction box of the present invention comprises a housing and a lid assembly. In the preferred embodiment, the housing is generally rectangular in shape having two side walls, a top wall, a bottom wall, and a rear wall. In other embodiments, the housing could have a different shape and a different number of walls. The lid assembly generally comprises a base portion and a cover section. The cover section is curved having a radius of curvature substantially equal to the radius of curvature of the structure in which it will be installed. In one embodiment the cover section is provided with grips to facilitate the removal of the lid assembly from the concrete during the first removal of the lid assembly. The cover section may also be provided with receptacle mounting means to facilitate the mounting of electrical receptacles, weatherproof covers, or other similar devices, thereto.

As will be appreciated, the invention is capable of other and different embodiments, and its several details are capable of modifications in various respect, all without departing from the spirit of the invention. Accordingly, the drawings and description of the preferred embodiment are to be regarded as illustrative in nature and not restrictive.

BRIEF DESCRIPTION OF THE DRAWINGS

The present invention satisfies the needs noted above as will become apparent from the following description when read in conjunction with the accompanying drawings wherein.

DETAILED DESCRIPTION OF THE PREFERRED EMBODIMENT

Figure 1:
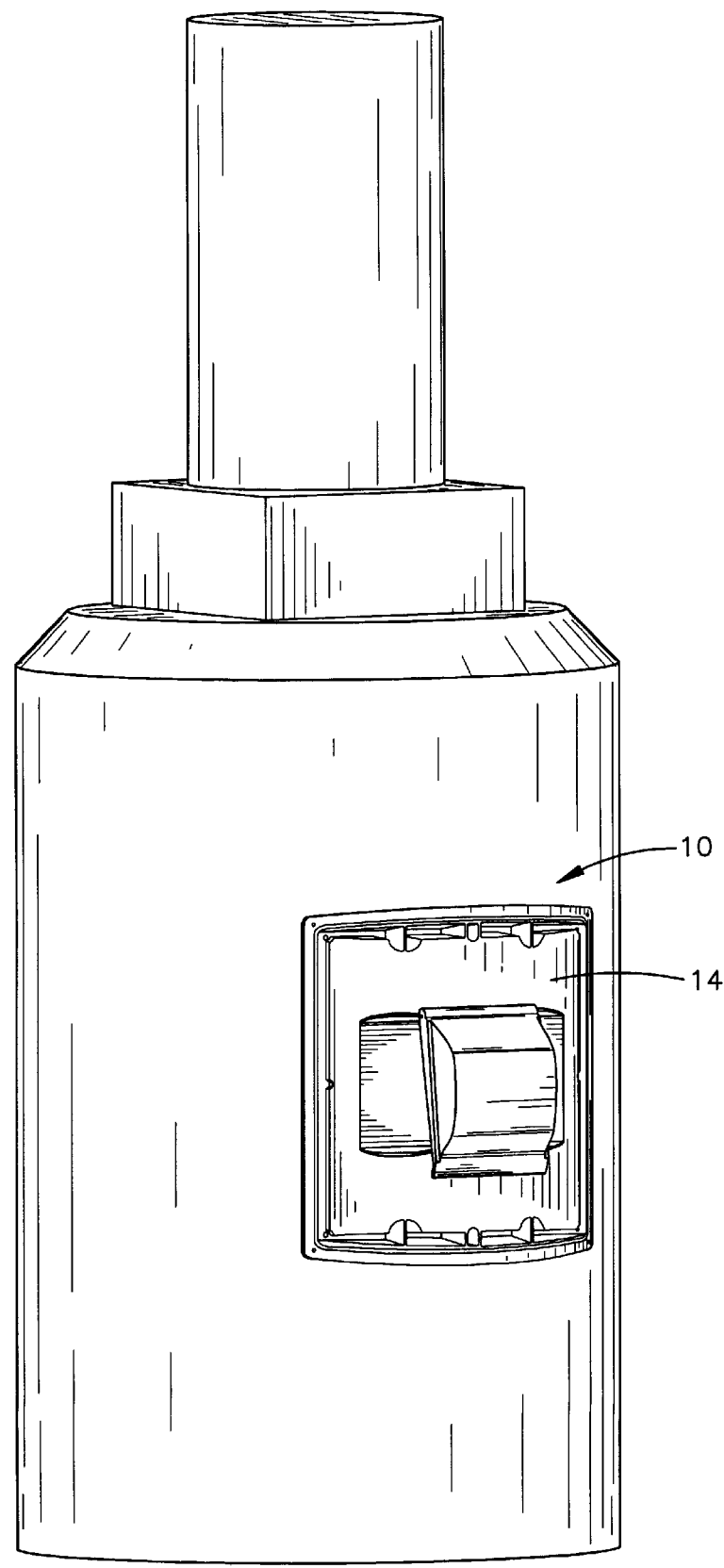
FIG. 1 is a front view of a junction box comprising a preferred embodiment of the invention invention installed in a concrete pier.

Referring now to the drawings, FIGS. 1, 2, 3, and 4 set forth a preferred embodiment of the present electrical junction box 10 constructed according to the teachings of the present invention. The junction box 10 comprises a housing 12 and a lid assembly 14. The housing 12 of the preferred embodiment is generally rectangular, although other shapes such as a triangular wedge shape could be used, and has two side walls 16 and 18, top and bottom walls 20 and 22, and rear wall 24. Side walls 16 and 18 and top and bottom walls 20 and 22 are each provided with lips 26, 28, 30 and 32, respectively, on their top edges. Lip 26 is joined at one end to lip 30 which in turn is joined at its other end to lip 28. The other end of lip 28 is joined to lip 32 which in turn is joined at its other end to lip 26 to form a generally planar rectangular surface. Lips 26, 28, 30 and 32 provide a convenient mounting location for lid assembly 14. Housing 12 can be provided in multiple sizes. The adaptation of junction box 10 for use in curved structures of varying diameters is accommodated by lid assembly 14. The housing wall members 16, 18, 20, 22, and 24 define a substantially enclosed space 34 which forms the interior portion of the junction box 10 wherein electrical connections and/or controls can be housed and accessed. This space 34 is easily accessed through the front portion of the housing 12 and is completely enclosed when lid assembly 14 is attached to the housing member.

Lid assembly 14 generally comprises a base portion 36 and a cover section 38. Base portion 36 includes top, bottom, and side base sections. The base sections have bottom mounting surfaces which mount to lips 26, 28, 30 and 32 of housing 12 when lid assembly 14 is installed on housing 12. The base sections are provided with walls 40 between planar surface 42 and cover section 38 which are slightly angled. Walls 40 are angled inwardly from cover section 38 to the mounting surfaces. The inwardly angular walls facilitate de-installation of lid assembly 14 from housing 12 after assembly in a concrete pier. The top and bottom base sections each have a curved portion 44 in which the radius of curvature is substantially equal to that of the exterior of the concrete pier into which the junction box will be positioned. Lid assembly 12 is generally secured to housing 14 through the use of securing means. In the preferred embodiment, securing means could comprise screws or other fasteners.

Cover section 38 generally comprises an outer edge section 42 and an inner cover section 58 separated by a circumferential groove 48. Cover section 38 is also provided with a plurality of extraction means 50 which aid in the removal of lid assembly 14 from housing 12 after assembly into a concrete pier. In the preferred embodiment, the extraction means 50 are grips that extend across circumferential groove 48 from points on outer edge section 56 to points on inner cover section 58. In the preferred embodiment shown, cover section 38 is provided with four grips 50, although fewer or more grips could be provided. Inner cover section 46 is also provided with recesses 52 which are adjacent to the areas at which grips 50 attach to inner cover section 46. Recesses 52 provide greater clearance to facilitate the use of pliers or similar devices when removing lid assembly 14 from housing 12.

Figure 2:
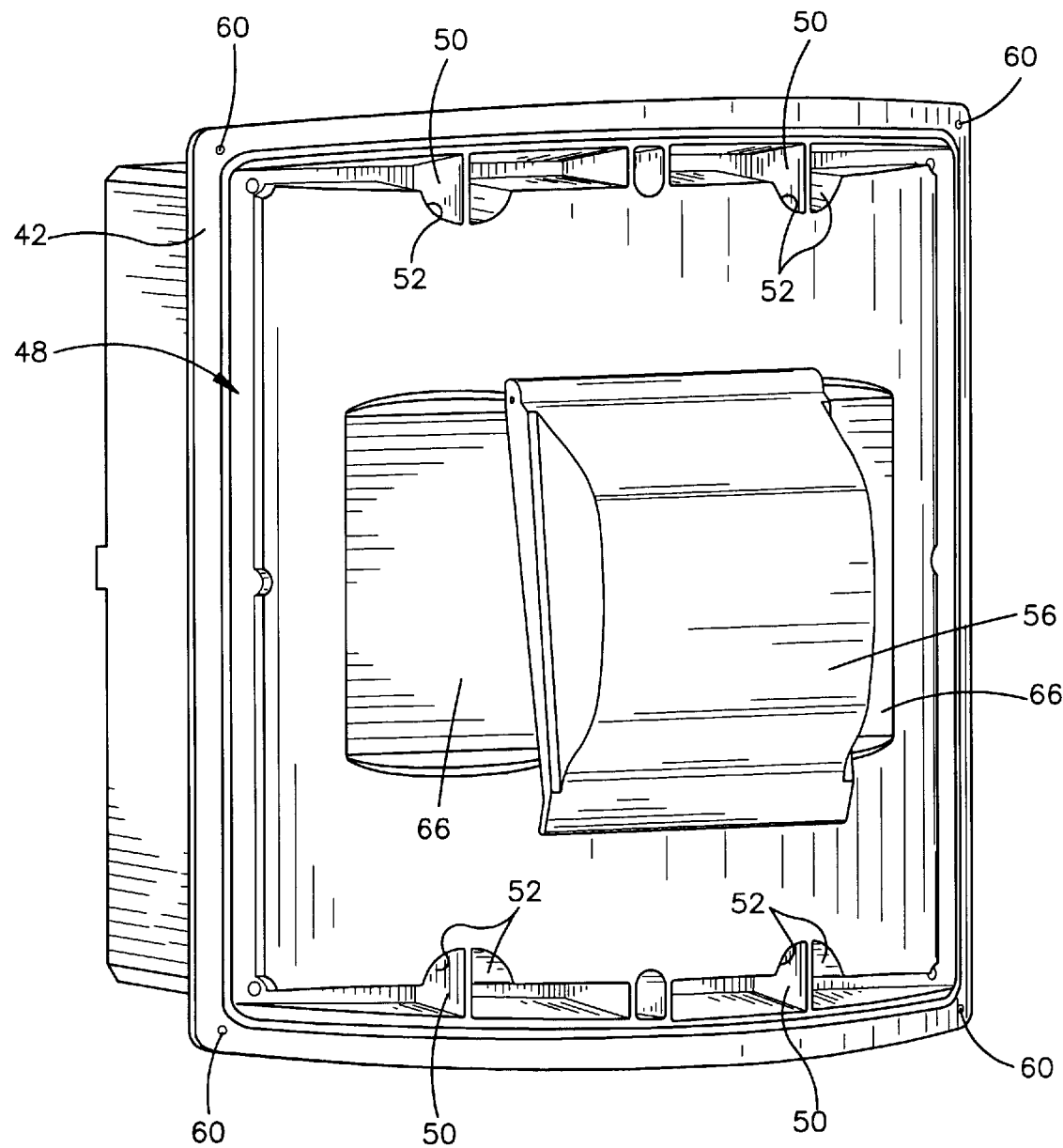
FIG. 2 is a front view of the junction box shown in FIG. 1.
Figure 3:
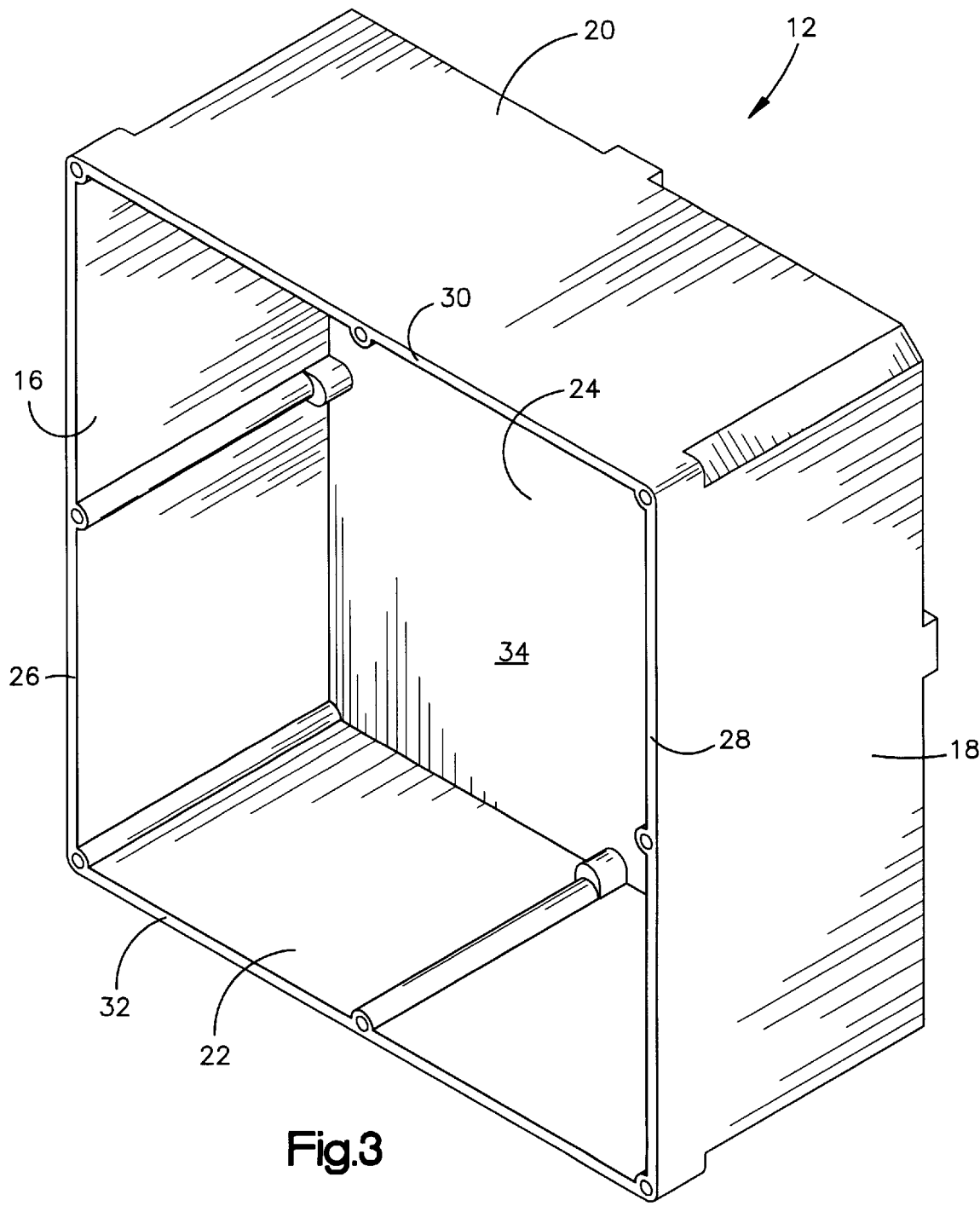
FIG. 3 is a perspective view of a part of the junction box of FIG. 1.
Figure 4:
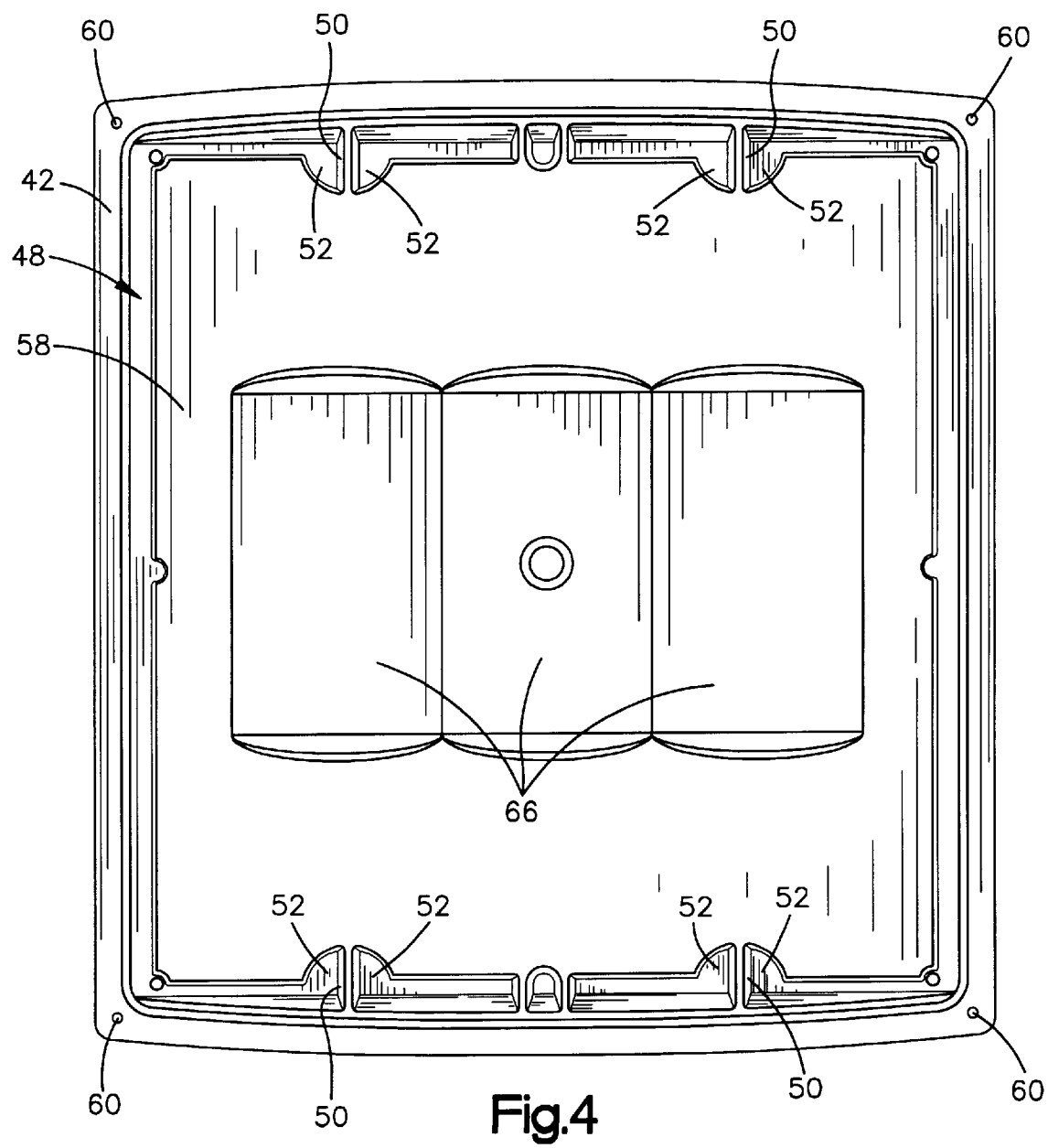
FIG. 4 is a front view of the a part of the junction box of FIG. 1.
Figure 5:
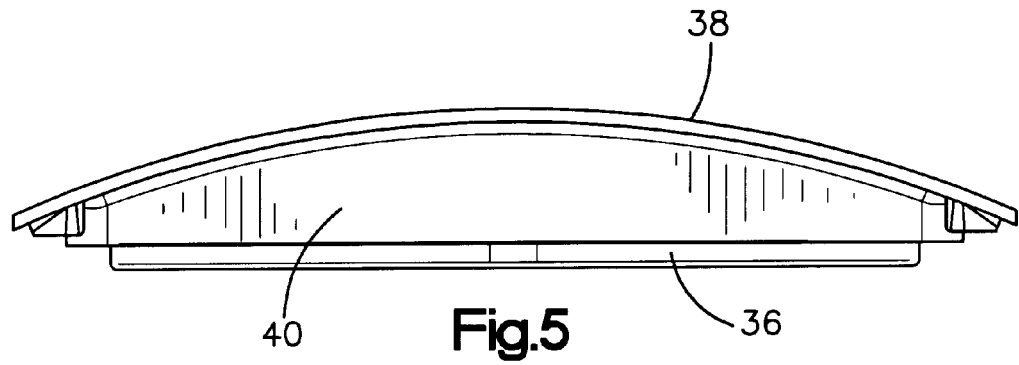
FIG. 5 is a side view of the part shown in FIG. 4.

Inner cover section 46 is also provided with receptacle mounting means 66 which provide convenient locations for the attachment of electrical receptacles and weatherproof receptacle covers 56 or similar devices as shown in FIGS. 1 and 2. In the preferred embodiment receptacle mounting means 66 are flat sections formed in inner cover section 46. An exemplary electrical receptacle is Leviton catalog number 5261 and an exemplary weatherproof cover 56 is Carlon part number E986DRN.

The use of a lid assembly 14 of the present invention provides additional benefits over the prior art junction boxes. Housing 12 may be used in concrete piers of different diameters. In prior art junction boxes, the entire junction box including both the housing and the lid were sized specifically for a particular concrete pier radius. Lid assembly 14 of the present invention is the only portion of junction box 10 that must be sized specifically for a particular pier radius. Lid assembly 14 is chosen such that its radius of curvature is substantially equal to that of the concrete pier in which it is to be installed. Thus, it is the lid and not the entire junction box that is matched to a particular concrete pier radius in the present invention.

Junction box 10 of the preferred embodiment is constructed from PVC. It is recognized and anticipated that the present electrical junction box may be constructed of different materials especially polymeric materials such as polycarbonate as long as it is non-metallic. This allows for junction box 10 to be U.L. listed. Also, junction box 10 does not have to be grounded. Junction box 10 can be formed through an injection molding process thus creating a lightweight, low cost junction box.

Junction box 10 may also be provided with a sealing means 58 such as a gasket or seal. Sealing means 58 preferably installs between the mounting surfaces and lips 26, 28, 30 and 32 to improve the waterproof capabilities of the present invention. Through the use of sealing means 58 and securing means, a preferred embodiment of junction box 10 has received numerous N.E.M.A. ratings.

Lid assembly 14 is also provided with form attachment means 60 which facilitates the installation of junction box 10 into the concrete pier Form attachment means 60 is preferably screw holes, although other means may be used. Form attachment means 60 provided a way to mount junction box 10 to the form prior to the pouring of cement. Fasteners pass through form attachment means 60 to hold junction box 10 in a connected fashion to the form. Because of the light weight nature of junction box 10, the junction box 10 can be mounted to the form in this manner.

Junction box 10 also simplifies the installation of light poles. At the shop prior to constructing a concrete pier, junction box 10, including lid assembly 14, can be mounted into a form. This is an improvement over the prior art junction box which requires the housing to be installed without the lid and the lid installed after the concrete has been poured and set. The method of the present invention decreases the likelihood of losing the lid, additional trips back to the shop to retrieve the lid, etc., thus reducing construction costs and time. Junction box 10, therefore, can be carried out to the construction site already installed in a form and ready for use.

At the construction site after a hole has been dug for the concrete pier, the form with junction box 10 pre-installed is placed in the hole. Two conduits are placed in the form, one extending from the bottom of the hole where the power wires are located to junction box 10 and the other extending from junction box 10 to the top of the form. The electrical power wires in the hole can then be pulled through the bottom conduit and routed into the junction box 10. Cement can then be poured into the form and around the conduit. After the cement has set and cured, the form can be removed. When the light pole is ready for installation, wires from the light fixture can be pulled through the top conduit and into the junction box 10. The light pole can then be installed onto the concrete pier. When the contractor is ready to connect power to the light fixture, the contractor merely needs to remove lid assembly 14 from housing 12 and connect the wires. Housing 12 is permanently secured within the cement pier and provides easy access to and a convenient location for connecting the electrical power wires. Grips 50 provide a convenient location to aid in removing lid assembly 14 from housing 12 for the first time after the concrete has set. It has also been found that inwardly angled walls 40 facilitate the de-installation of lid assembly 14 from housing 12.

Another advantage not found in prior art devices is the provision of an area on which to mount electrical receptacles and weatherproof covers to electrical junction box 10. Cover section 38 is provided with receptacle mounting means 54 which provide a convenient location on which to mount electrical receptacles and weatherproof covers. Also, because junction box 10 is made from a non-metallic material, it can easily be modified to provide access for wires from the electrical receptacle to the power wires within junction box 10. Still another advantage of electrical junction box 10 is that it allows for the mounting of additional support hardware, such as fuses, circuit breakers and terminal blocks, inside the junction box 10.

Figure 7:
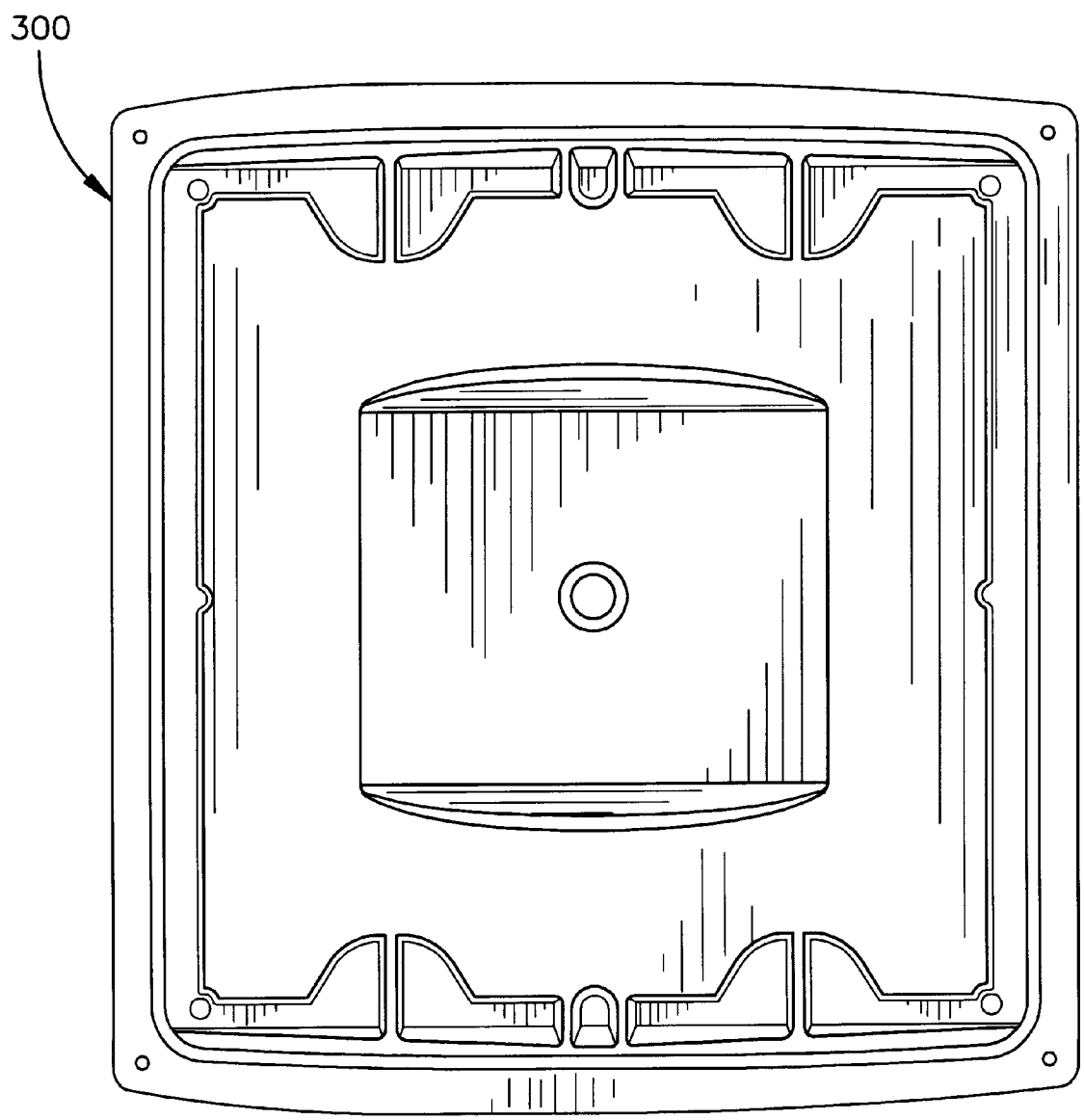
FIG. 7 is a front view of a part of a junction box comprising a third embodiment of the invention.
Figure 6:
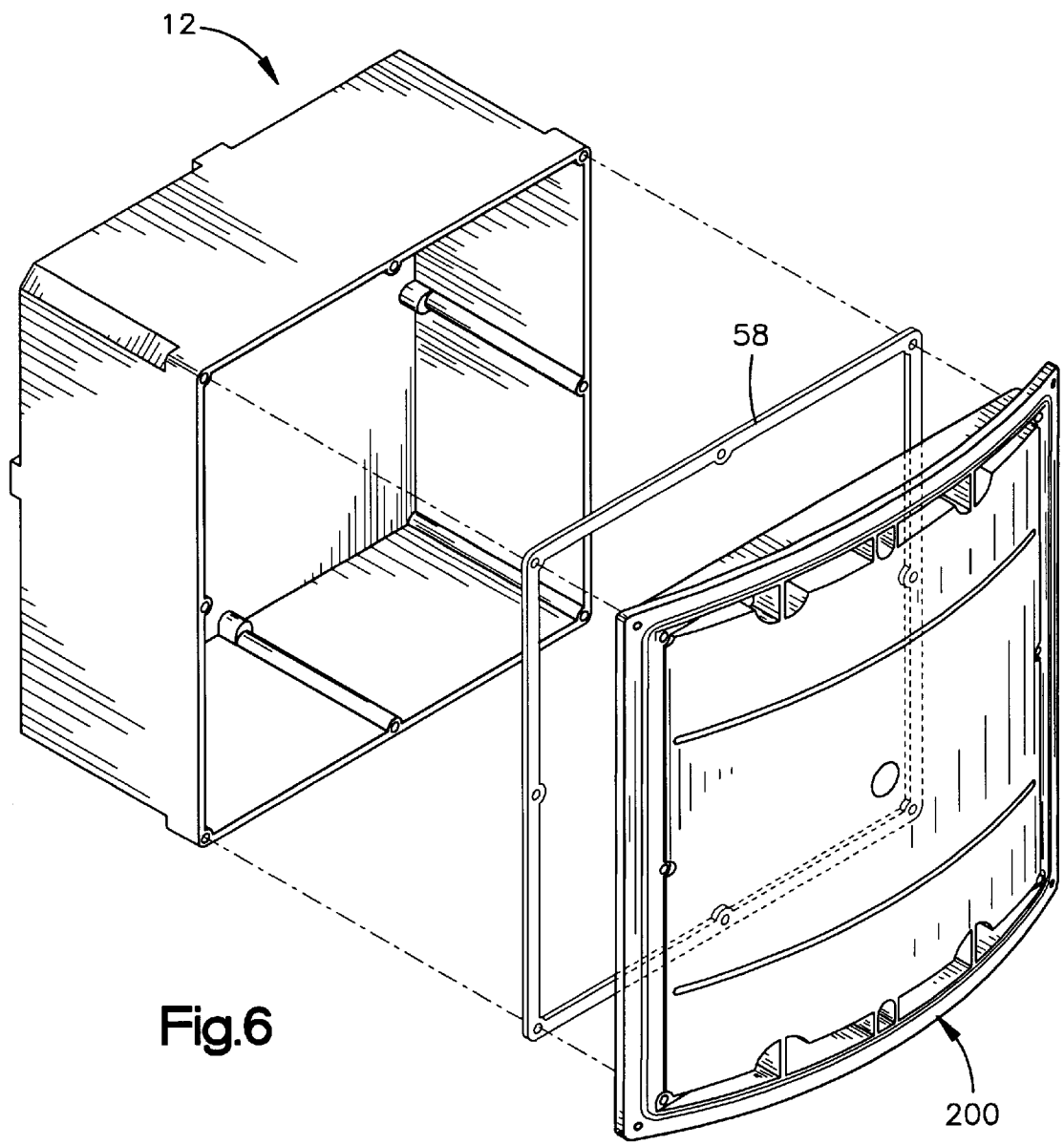
FIG. 6 is a an exploded view of a junction box comprising a second embodiment of the invention.

Having described in detail the preferred embodiment of the present invention, including its preferred methods of use, it is to be understood that this invention could be carried out with different elements and steps. For example, alternative embodiments having differing lid structures 200 and 300 are shown in FIGS. 6 and 7. This preferred embodiment is presented only by way of example and is not meant to limit the scope of the present invention which is defined by the following claims.

What is claimed:

1. An electrical junction box for use within a curved structure, said junction box comprising:

a housing member having an opening; and a lid assembly configured to close said opening, said lid assembly having a base portion and a cover portion, said base portion having a planar surface, said cover portion having a radius of curvature substantially conforming to the radius of curvature of the curved structure;

said cover portion including receptacle mounting means.

2. An electrical junction box for use within a curved structure, said junction box comprising:

a housing member having an opening; and a lid assembly configured to close said opening, said lid assembly having a base portion and a cover portion, said base portion having a planar surface, said cover portion having a radius of curvature substantially conforming to the radius of curvature of the curved structure;

said cover portion comprising an edge section, an inner cover section, and a groove section;

said inner cover section including receptacle mounting means.

3. An electrical junction box for use within a curved structure, said junction box comprising:

a housing member having an opening;

a lid assembly configured to close said opening, said lid assembly having a base portion and a cover portion, said base portion having a planar surface, said cover portion having a radius of curvature substantially conforming to the radius of curvature of the curved structure; and an electrical receptacle mounted to said cover portion.

4. The electrical junction box according to claim 3 further comprising a weatherproof cover mounted over said electrical receptacle.

5. A method of installing a light pole comprising the steps of:

providing a form, electrical power wires to be connected to the light pole, and an electrical junction box comprising:

a housing member having an opening; and a lid assembly configured to close said opening, said lid assembly having a base portion and a cover portion, said base portion having a planar surface, said cover portion having a radius of curvature substantially conforming to the radius of curvature of the curved structure;

mounting said electrical junction box in the form;

pulling said electrical wires into said junction box;

pouring cement into said form;

removing said lid assembly after said cement has cured; and connecting said electrical wires inside said junction box to said light pole.

6. The method according to claim 5 further comprising the steps of:

providing an electrical receptacle; and mounting said electrical receptacle to said lid assembly.

7. The method according to claim 5 further comprising the steps of:

providing a weatherproof cover; and mounting said cover to said lid assembly.

8. The method according to claim 5 further comprising the step of mounting a support hardware item inside said housing member.

9. The method according to claim 5 wherein said lid assembly further comprises at least one extraction means.

10. The method according to claim 9 wherein said step of removing comprises the steps of:

grabbing said lid assembly at said extraction means; and pulling said extraction means until said lid assembly is removed.

11. The method according to claim 5 further comprising the steps of:

provided receptacle mounting means on said lid assembly;

providing an electrical receptacle; and mounting said electrical receptacle to said receptacle mounting means.

12. The method according to claim 11 further comprising the steps of:

providing a weatherproof cover; and mounting said cover to said lid assembly.

13. An electrical junction box for use within a curved structure, said junction box comprising:

a housing member configured to be embedded within the curved structure, said housing member having an opening; and a lid assembly configured to close said opening, said lid assembly having a cover portion with a curvature substantially conforming to the curvature of the curved structure;

said cover portion of said lid assembly configured to mount a receptacle.

14. An electrical junction box as defined in claim 13 wherein said cover portion of said lid assembly includes a planar section configured to mount a receptacle.

15. An electrical junction box as defined in claim 13 wherein said cover portion of said lid assembly comprises a peripheral edge section, a central cover section, and a groove surrounding said central section.

16. An electrical junction box as defined in claim 13 wherein said lid assembly has a grip.

17. An electrical junction box as defined in claim 13 wherein a support hardware item is mounted inside said housing member.

18. A method of installing a light pole comprising the steps of:

providing an electrical junction box, said junction box having a lid assembly with a curvature substantially conforming to the curvature of a concrete structure;

mounting said junction box in a form that is configured to define said concrete structure when concrete is subsequently poured into said form; and removing said cover portion from said junction box after said concrete has been poured and cured in said form so as to provide access for making electrical connections in said junction box.

19. The method according to claim 18 wherein said cover portion is provided with extraction grips wherein said extraction step comprises:

grabbing said cover portion at said grip; and pulling said grip until said cover portion is removed.

20. The method according to claim 18 further comprising the steps of:

providing an electrical receptacle; and mounting said electrical receptacle to said cover portion.

21. The method according to claim 18 further comprising the steps of:

providing a weatherproof cover; and mounting said weatherproof cover portion to said lid assembly.

22. The method according to claim 18 further comprising the step of mounting a support hardware item inside said electrical junction box.

* * * * *